United States Patent
Aida et al.

(10) Patent No.: US 11,658,750 B2
(45) Date of Patent: May 23, 2023

(54) SUBMARINE OPTICAL COMMUNICATION SYSTEM AND SUBMARINE BRANCHING APPARATUS

(71) Applicant: NEC Corporation, Tokyo (JP)

(72) Inventors: Ryuji Aida, Tokyo (JP); Eduardo Mateo Rodriguez, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/756,200

(22) PCT Filed: Aug. 15, 2018

(86) PCT No.: PCT/JP2018/030333
§ 371 (c)(1),
(2) Date: Apr. 15, 2020

(87) PCT Pub. No.: WO2019/087520
PCT Pub. Date: May 9, 2019

(65) Prior Publication Data
US 2021/0194597 A1    Jun. 24, 2021

(30) Foreign Application Priority Data

Oct. 30, 2017    (JP) .............................. JP2017-208874

(51) Int. Cl.
*H04B 10/00*    (2013.01)
*H04B 10/80*    (2013.01)
(Continued)

(52) U.S. Cl.
CPC ............ *H04B 10/80* (2013.01); *H04B 10/25* (2013.01); *H04Q 11/0005* (2013.01)

(58) Field of Classification Search
CPC ..... H04B 10/80; H04B 10/25; H04Q 11/0005
See application file for complete search history.

(56) References Cited

U.S. PATENT DOCUMENTS 6,909,853 B1    6/2005  Yamashita
8,630,538 B2    1/2014  Nashimoto et al.
(Continued)

FOREIGN PATENT DOCUMENTS

CN    1195436 A    10/1998
CN    103460623 A    12/2013
(Continued)

OTHER PUBLICATIONS

Yoshino, Manabu et al., New Access System Architecture (FASA)—Enabling Provision of Services Flexibility and Promptly, NTT Technical Review, vol. 28, No. 8, Aug. 2016 (both English Version and original in Japanese), 10 pages.
(Continued)

*Primary Examiner* — Pranesh K Barua

(57) ABSTRACT

An optical transmission apparatus outputs a main signal. An optical transmission apparatus superimposes a monitoring signal on an optical signal and outputs it. A submarine branching apparatus includes a return unit configured to return the monitoring signal received from the optical transmission apparatus and is configured to switch an output destination of the main signal received from the optical transmission apparatus to an optical transmission apparatus or the optical transmission apparatus. The optical transmission apparatus is configured to detect the monitoring signal returned from the return unit and notifies the optical transmission apparatus of a result of the detection. The optical transmission apparatus instructs the submarine branching apparatus to switch the output destination of the main signal in accordance with the notification.

8 Claims, 11 Drawing Sheets

(51) Int. Cl.
  *H04B 10/25* (2013.01)
  *H04Q 11/00* (2006.01)

(56) References Cited

U.S. PATENT DOCUMENTS

| | | | |
|---|---|---|---|
| 9,755,734 B1* | 9/2017 | Vusirikala | H04J 14/0221 |
| 2003/0081280 A1* | 5/2003 | Parsons | H04B 10/071 398/16 |
| 2004/0156602 A1 | 8/2004 | Verhaege et al. | |
| 2005/0259990 A1 | 11/2005 | Yokota | |
| 2007/0138417 A1* | 6/2007 | Sugiyama | H04B 10/032 250/551 |
| 2010/0027993 A1* | 2/2010 | Yamaguchi | H04J 14/0267 398/25 |
| 2011/0076017 A1 | 3/2011 | Midorikawa et al. | |
| 2012/0177362 A1 | 7/2012 | Zhang et al. | |
| 2015/0093116 A1* | 4/2015 | Wang | H04Q 11/0005 398/104 |
| 2018/0054271 A1* | 2/2018 | Abe | H04J 14/0219 |

FOREIGN PATENT DOCUMENTS

| | | |
|---|---|---|
| CN | 103493413 A | 1/2014 |
| CN | 103959717 A | 7/2014 |
| CN | 103975534 A | 8/2014 |
| CN | 104685811 A | 6/2015 |
| CN | 104798324 A | 7/2015 |
| CN | 107078812 A | 8/2017 |
| EP | 1598960 A1 | 11/2005 |
| JP | S63-253926 A | 10/1988 |
| JP | H05-90997 A | 4/1993 |
| JP | H09233023 A | 9/1997 |
| JP | H10-150409 A | 6/1998 |
| JP | 2005333425 A | 12/2005 |
| JP | 2010-020361 A | 1/2010 |
| JP | 2011077808 A | 4/2011 |
| JP | 2012205045 A | 10/2012 |
| JP | 5892950 B2 | 3/2016 |
| JP | 2017-005384 A | 1/2017 |
| WO | 2016/147610 A1 | 9/2016 |
| WO | WO-2016147610 A1 * | 9/2016 ......... H04J 14/0212 |

OTHER PUBLICATIONS

PCT/ISA/210 International Search Report corresponding to PCT/JP2018/030333, dated Nov. 6, 2018, 2 pages.

Chinese Office Action for CN Application No. 201880070924.5 dated Aug. 3, 2022 with English Translation.

Extended European Search Report for EP Application No. EP18872584.0 dated Dec. 4, 2020.

* cited by examiner

SUBMARINE OPTICAL COMMUNICATION SYSTEM AND SUBMARINE BRANCHING APPARATUS

CROSS-REFERENCE TO RELATED APPLICATIONS

This application is a national stage application of International Application No. PCT/JP2018/030333 entitled "SUBMARINE OPTICAL COMMUNICATION SYSTEM AND SUBMARINE BRANCHING APPARATUS," filed on Aug. 15, 2018, which claims the benefit of the priority of Japanese Patent Application No. 2017-208874 filed on Oct. 30, 2017, the disclosures of each of which are hereby incorporated by reference in their entirety.

TECHNICAL FIELD

The present disclosure relates to a submarine optical communication system and a submarine branching apparatus.

BACKGROUND ART

A submarine optical communication system that enables optical communication by connecting base stations on land via a submarine cable is being widely used. A submarine relay apparatus that amplifies an attenuation of a transmission signal, a submarine branching apparatus that enables optical communication among three or more base stations disposed on land, etc. are inserted in the submarine cable.

Generally, the submarine branching apparatus is inserted in-between a submarine cable (a trunk path) that connects two trunk stations, and a submarine cable that configures a branch path branched from the submarine branching apparatus is connected to a branch station. By this configuration, the optical signal transmitted from the trunk station is transmitted through the trunk path, the submarine branching apparatus, and the branch path and received by the branch station.

For this kind of submarine optical communication system, a system capable of handling failures that occur in the paths through which an optical signal is transmitted is proposed (Patent Literature 1). In this system, power is supplied to a submarine branching apparatus from a branch terminal (i.e., a branch station) through a branch path. When a failure occurs in the branch path, power supply from the branch terminal to the submarine branching apparatus stops, and when the power supply stops, an optical switch inside the submarine branching apparatus is switched so as to switch the output destination of the optical signal transmitted from one of the trunk stations from the branch path to the trunk path. By this configuration, even when a failure occurs in the branch path, it is possible to switch to an optical transmission between the trunk stations.

CITATION LIST

Patent Literature

Patent Literature 1: Japanese Patent No. 5892950

SUMMARY OF INVENTION

Technical Problem

However, it is conceivable to provide a failure detection mechanism to a branch station in order to detect a failure in a branch path. In this case, there is a problem in realizing switching of a transmission path of an optical signal in accordance with the failure detected by the branch station.

For example, in the system described above, the terminal (station) gives an instruction to the submarine branching apparatus to switch the path, however, when the branch station detects a failure in the branch path, it is not possible for the terminal (station) to give an instruction to the submarine branching apparatus to switch the path through the branch path.

The present disclosure has been made in view of the matters mentioned above and has an object to detect a failure in a branch path between a submarine branching apparatus and an optical transmission apparatus by the optical transmission apparatus and to switch a transmission path of an optical signal in accordance with the result of the detection.

Solution to Problem

A submarine optical communication system according to a first example aspect includes: a first optical transmission apparatus configured to output a first optical signal; a second optical transmission apparatus; a third optical transmission apparatus configured to output an optical signal and a monitoring signal; and a submarine branching apparatus including a first return unit configured to return the monitoring signal received from the third optical transmission apparatus and configured to switch an output destination of the first optical signal received from the first optical transmission apparatus to the second optical transmission apparatus or the third optical transmission apparatus, in which the third optical transmission apparatus is further configured to detect the monitoring signal returned from the first return unit and notify the first optical transmission apparatus of a result of the detection, and the first optical transmission apparatus is further configured to instruct the submarine branching apparatus to switch the output destination of the first optical signal in accordance with the notification.

A submarine branching apparatus according to a second example aspect includes: a first optical switch configured to receive a first optical signal from a first optical transmission apparatus; a second optical switch configured to output the received optical signal to a second optical transmission apparatus; a control unit configured to control the first and the second optical switches in accordance with an instruction from the first optical transmission apparatus; and a return unit configured to return a monitoring signal received from a third optical transmission apparatus to the third optical transmission apparatus, in which when an optical intensity of the monitoring signal received by the third optical transmission apparatus is smaller than a prescribed value, the control unit switches: an output destination of the first optical signal of the first optical switch from the third optical transmission apparatus to the second optical switch; and an input source of the optical signal received by the second optical switch from the third optical transmission apparatus to the first optical switch.

Advantageous Effects of Invention

According to the present disclosure, a failure in a branch path between a submarine branching apparatus and an optical transmission apparatus is detected by the optical transmission apparatus and a transmission path of an optical signal is switched in accordance with the result of the detection.

DESCRIPTION OF EMBODIMENTS

Hereinbelow, example embodiments of the present disclosure are explained with reference to the drawings. The same symbols are assigned to the same elements throughout the drawings and duplicated explanations are omitted as necessary.

First Example Embodiment

Figure 1:
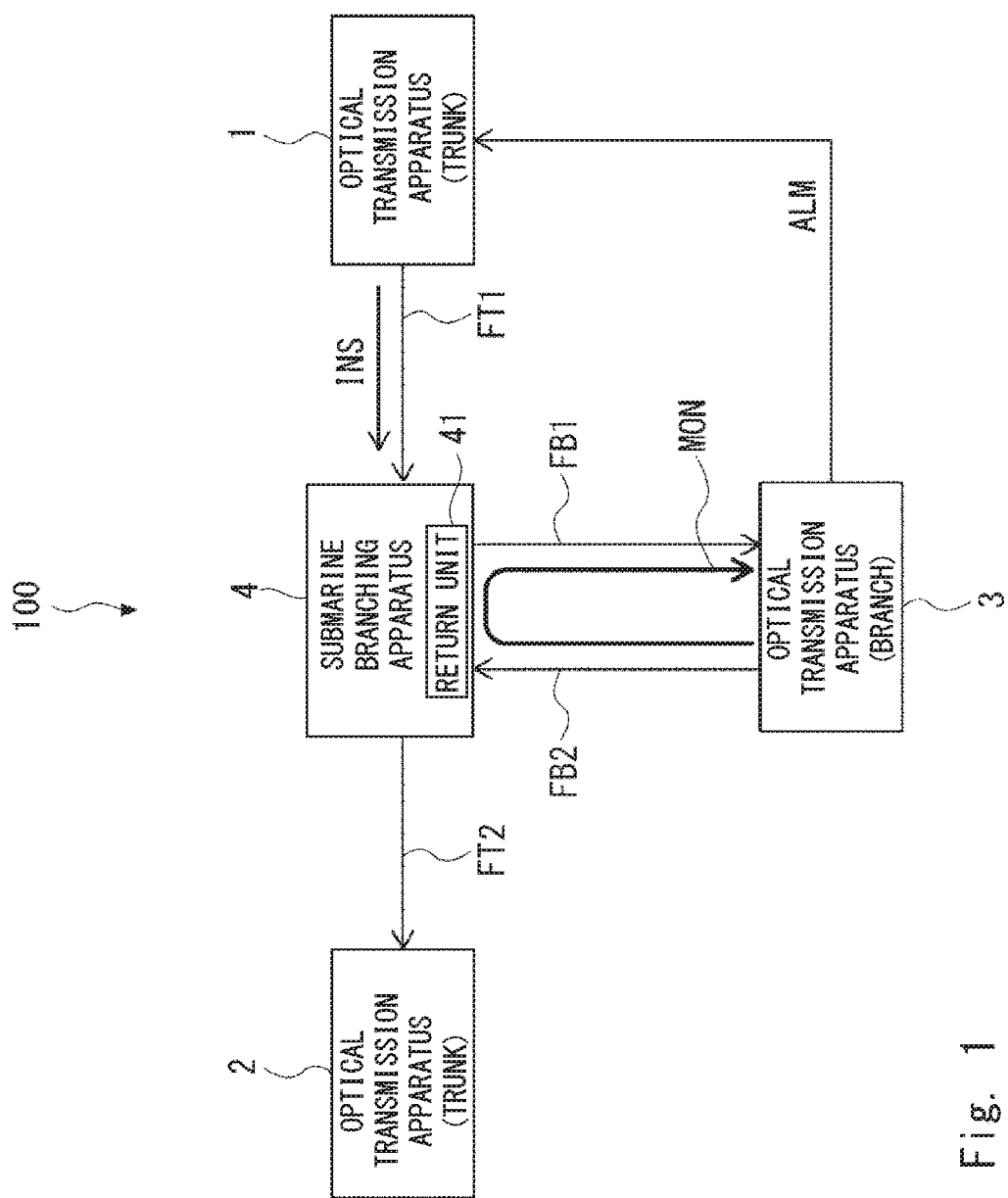
FIG. 1 is a diagram showing a basic configuration of a submarine optical communication system according to a first example embodiment.

A submarine optical communication system 100 according to a first example embodiment is explained. FIG. 1 is a diagram showing a basic configuration of the submarine optical communication system 100 according to the first example embodiment. The submarine optical communication system 100 includes optical transmission apparatuses 1 to 3 and a submarine branching apparatus 4. Note that here, the optical transmission apparatuses 1 to 3 are also referred to as the first to third optical transmission apparatuses, respectively.

Each of the optical transmission apparatuses 1 and 2 is provided within a trunk station. The optical transmission apparatus 1 and the submarine branching apparatus 4 are connected with each other by an optical fiber FT1 incorporated within the submarine cable. The optical transmission apparatus 2 and the submarine branching apparatus 4 are connected with each other by an optical fiber FT2 incorporated within the submarine cable. As described above, a trunk path TL to which a main signal that is an optical signal is transmitted is configured of the optical transmission apparatus 1, the optical transmission apparatus 2, the submarine branching apparatus 4, and the optical fibers FT1 and FT2.

The optical transmission apparatus 3 is provided within a branch station. The optical transmission apparatus 3 and the submarine branching apparatus 4 are connected with each other by an optical fiber FB1 (also referred to as a first optical fiber) for downlink communication and an optical fiber FB2 (also referred to as a second optical fiber) for uplink communication that are incorporated in the submarine cable. As described above, a branch path is configured of the optical transmission apparatus 3, the submarine branching apparatus 4, and the optical fibers FB1 and FB2.

Figure 2:
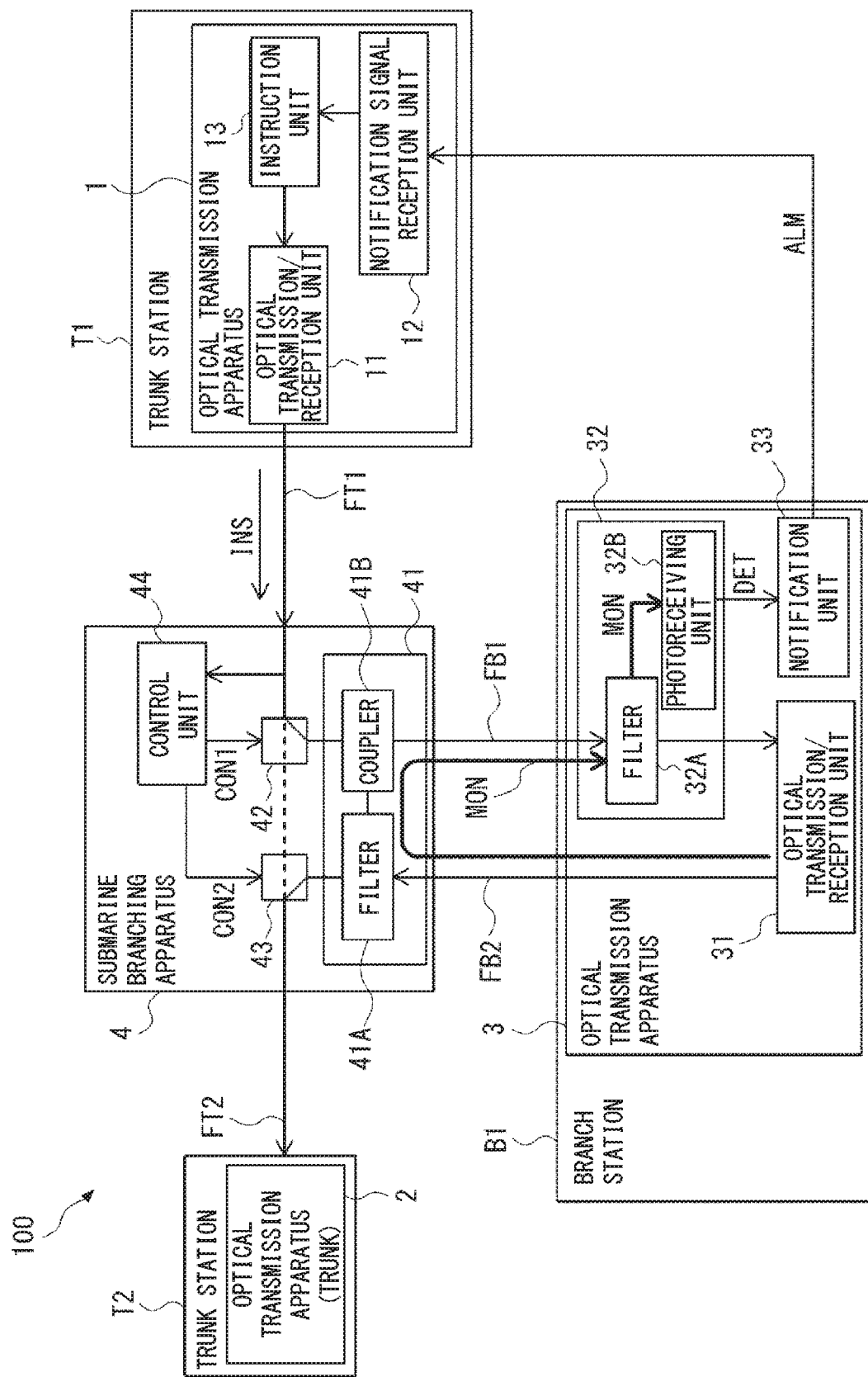
FIG. 2 is a diagram showing a configuration of the submarine optical communication system according to the first example embodiment in more detail.

Next, a configuration of the submarine optical communication system 100 is described in more detail. FIG. 2 is a diagram showing the submarine optical communication system 100 according to the first example embodiment.

The optical transmission apparatuses 1 and 2 are installed inside a trunk station T1 and a trunk station T2, respectively. The optical transmission apparatus 3 is installed inside a branch station B1.

The optical transmission apparatus 1 installed in the trunk station T1 includes an optical transmission/reception unit 11, a notification signal reception unit 12, and an instruction unit 13.

The optical transmission/reception unit 11 outputs a main signal (also referred to as a first optical signal) to the submarine branching apparatus 4 as well as an instruction signal INS for instructing switching of a transmission path of the main signal in accordance with a request from the instruction unit 13 to the submarine branching apparatus 4. Further, the optical transmission/reception unit 11 can receive the optical signal.

Here, a wavelength-division multiplexed signal that has been modulated by a modulation technique such as the DP-QPSK (Dual Polarization-Quadrature Phase Shift Keying) is used as the main signal.

The notification signal reception unit 12 receives a notification signal ALM from the optical transmission apparatus 3 and informs the instruction unit 13 of the result of the notification. The notification signal reception unit 12 may be configured of an EMS (Element Management System) provided to the optical transmission apparatus 1.

The instruction unit 13 refers to the result of the notification received from the notification signal reception unit 12 and when there is a failure in the branch path, instructs the optical transmission/reception unit 11 to output the instruction signal INS for switching the transmission path of the main signal from the branch path to the trunk path.

The instruction signal INS may be superimposed on the main signal and output to the submarine branching apparatus 4. The instruction signal INS may be a signal having a wavelength other than a wavelength used for the main signal. Further, the instruction signal INS may be superimposed on the main signal by performing full-wave modulation (for example, amplitude modulation) of the main signal.

Figure 3:
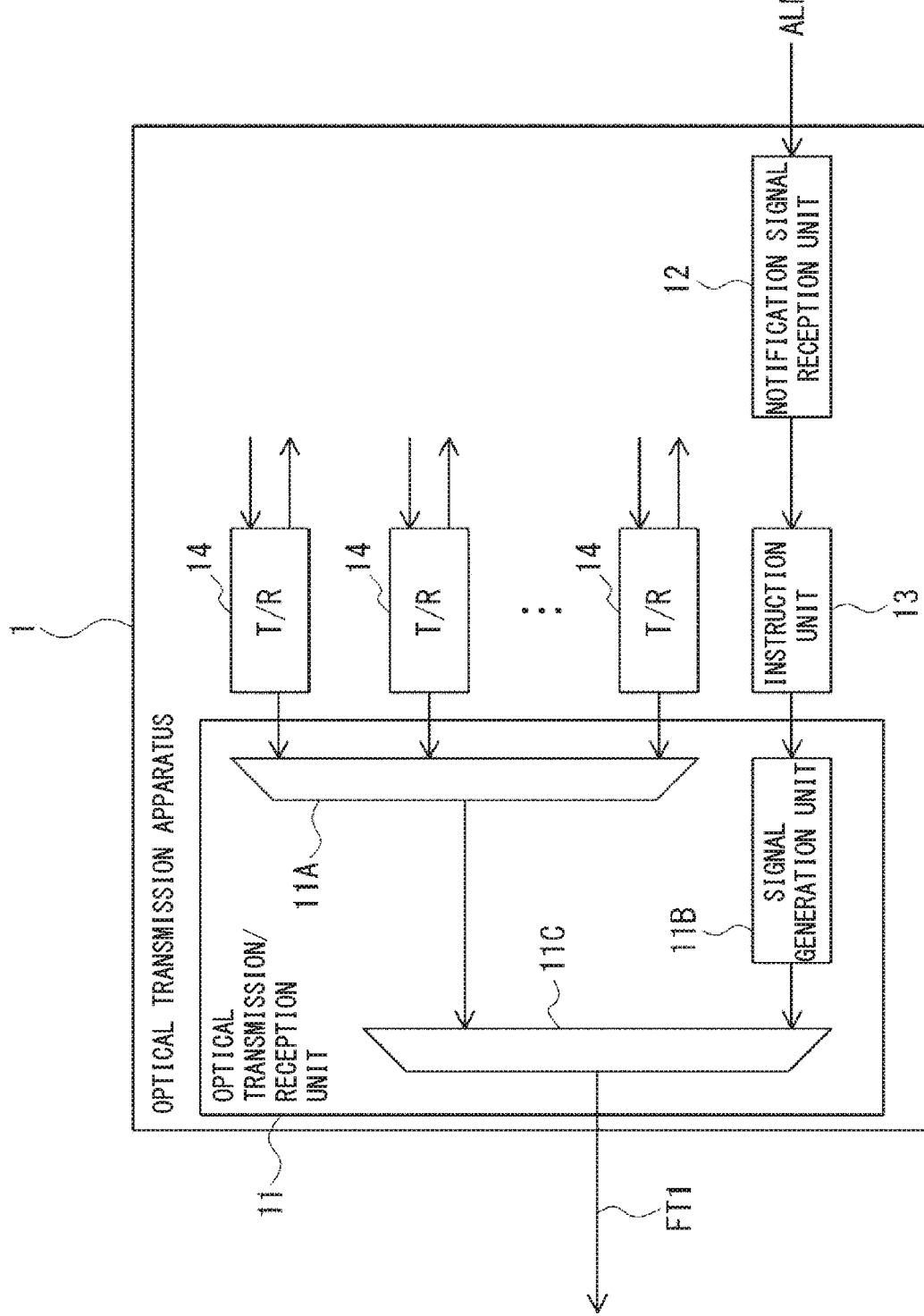
FIG. 3 is a diagram showing an example of a configuration of an optical transmission apparatus according to an example embodiment.

Here, an example of a configuration of the optical transmission apparatus 1 is explained. FIG. 3 shows an example of a configuration of the optical transmission apparatus 1 according to the example embodiment. As shown in FIG. 3, the optical transmission/reception unit 11 may be configured so as to have a plurality of optical transmitters/receivers (transponders) 14 connectable thereto. The optical transmitters/receivers 14 are manufactured by various venders and an arbitrary transponder which conforms to various standards may be used. Further, the optical transmission/reception unit 11 may be configured of an OCI (Open Cable Interface).

For example, the optical signals output from the plurality of optical transmitters/receivers 14 are multiplexed by a multiplexer 11A of the optical transmission/reception part 11 to become a main signal which is output to a multiplexer 11C. The instruction unit 13 controls a signal generation unit 11B of the optical transmission/reception unit 11 whereby the instruction signal INS is output from the signal generation unit 11B to the multiplexer 11C. The main signal and the instruction signal INS are multiplexed by the multiplexer 11C and output to the optical fiber FT1.

The optical transmission apparatus 2 installed in the trunk station T2 can receive the main signal output from the optical transmission apparatus 1 and transmitted through the trunk path or the branch path. For example, the optical transmission apparatus 2 may include an optical transmission/reception unit that is the same as the optical transmission/reception unit 11 of the optical transmission reception apparatus 1, or may have the same configuration as that of the optical transmission apparatus 1.

The submarine branching apparatus 4 is an apparatus that is installed at the bottom of the sea for branching an optical signal that is transmitted through the submarine cable laid at the bottom of the sea. The submarine branching apparatus 4 includes a return unit 41, optical switches 42 and 43, and a control unit 44.

The return unit 41 (also referred to as a first return unit) can selectively return a monitoring signal MON output from the optical transmission apparatus 3 to the optical transmission apparatus 3. For example, the return unit 41 includes a filer 41A and a coupler 41B. The filter 41A is a wavelength filter and selectively separates only a light having a wavelength of the monitoring signal MON. Therefore, the monitoring signal MON output from the optical transmission apparatus 3 to the optical fiber FB2 is selectively separated by the filter 41A, and the separated monitoring signal MON is output to the optical transmission apparatus 3 through the optical fiber FB1 by the coupler 41B.

The optical switch 42 (also referred to as a first optical switch) can switch an output path (output destination) of the main signal output from the optical transmission apparatus 1 between the branch path (i.e., a path through which the main signal is output to the optical fiber FB1) and the trunk path (i.e., a path through which the main signal is output to the optical switch 43) in accordance with a control signal CON1 provided from the control unit 44.

The optical switch 43 (also referred to as a second optical switch) can switch an input path (an input destination) of the received optical signal to the branch path (i.e., a path through which the main signal is received via the optical fiber FB2) or the trunk path (i.e., a path through which the main signal is received from the optical switch 42) in accordance with a control signal CON2 provided from the control unit 44.

The control unit 44 can receive the instruction signal INS input from the optical transmission apparatus 1 and controls switching between the optical switches 42 and 43 in accordance with the instruction signal.

The branch station B1 provided to the optical transmission apparatus 3 includes an optical transmission/reception unit 31, a detection unit 32, and a notification unit 33.

The optical transmission/reception unit 31 can receive the main signal output from the optical transmission apparatus 1 via the optical fiber FB1 and the detection unit 32 and can output an optical signal having a prescribed wavelength to the submarine branching apparatus 4 via the optical fiber FB2. Further, the optical transmission/reception unit 31 can output the monitoring signal MON having a prescribed wavelength to the submarine branching apparatus 4 via the optical fiber FB2.

The monitoring signal MON may be superimposed on the main signal and output to the submarine branching apparatus 4. The monitoring signal MON may be a signal having a wavelength other than a wavelength used for the main signal. For example, when the main signal, which is an object of reception by the optical transmission apparatus 3, is a signal of the C-band (1530 nm to 1565 nm), a signal of the L-band (1565 nm to 1625 nm) may be used as the monitoring signal MON.

The detection unit 32 detects the monitoring signal MON output from the optical transmission/reception unit 31 to the submarine branching apparatus 4 and returned to the optical transmission apparatus 3 from the return unit 41 of the submarine branching apparatus 4 and outputs a detection signal DET that indicates the result of the detection. For example, the detection unit 32 detects an optical intensity of the monitoring signal MON and outputs a signal that indicates the optical intensity as the detection signal DET.

The detection unit 32 includes, for example, a filter 32A and an optical reception unit 32B. The filter 32A is a wavelength filter and selectively separates only a light having a wavelength of the monitoring signal MON and transmits lights having other wavelengths. Therefore, the control signal MON returned from the return unit 41 of the submarine branching apparatus 4 is selectively separated by the filter 32A and the separated monitoring signal MON is detected by the optical reception unit 32B. The optical reception unit 32B is configured using, for example, a photodiode, and can generate the detection signal DET by converting the monitoring signal MON into an electric signal.

The notification unit 33 outputs the notification signal ALM indicating whether or not the monitoring signal MON has been detected to the notification signal reception unit 12 of the optical transmission apparatus 1 in accordance with the detection signal DET. The notification unit 33 informs the notification signal reception unit 12 that a failure has occurred in the branch path configured of the optical fibers FB1 and FB2 through the notification signal ALM when the optical intensity of the monitoring signal MON is smaller than a prescribed threshold value. The notification unit 33 may be configured as an EMS (Element Management System) provided to the optical transmission apparatus 3.

The notification signal ALM may be transmitted from the notification unit 33 to the notification signal reception unit 12 of the optical transmission apparatus 1 using either one of the radio communication or the cable communication, or may be transmitted, for example, via a network that is controlled by a UMS (Unified Management System).

Figure 4:
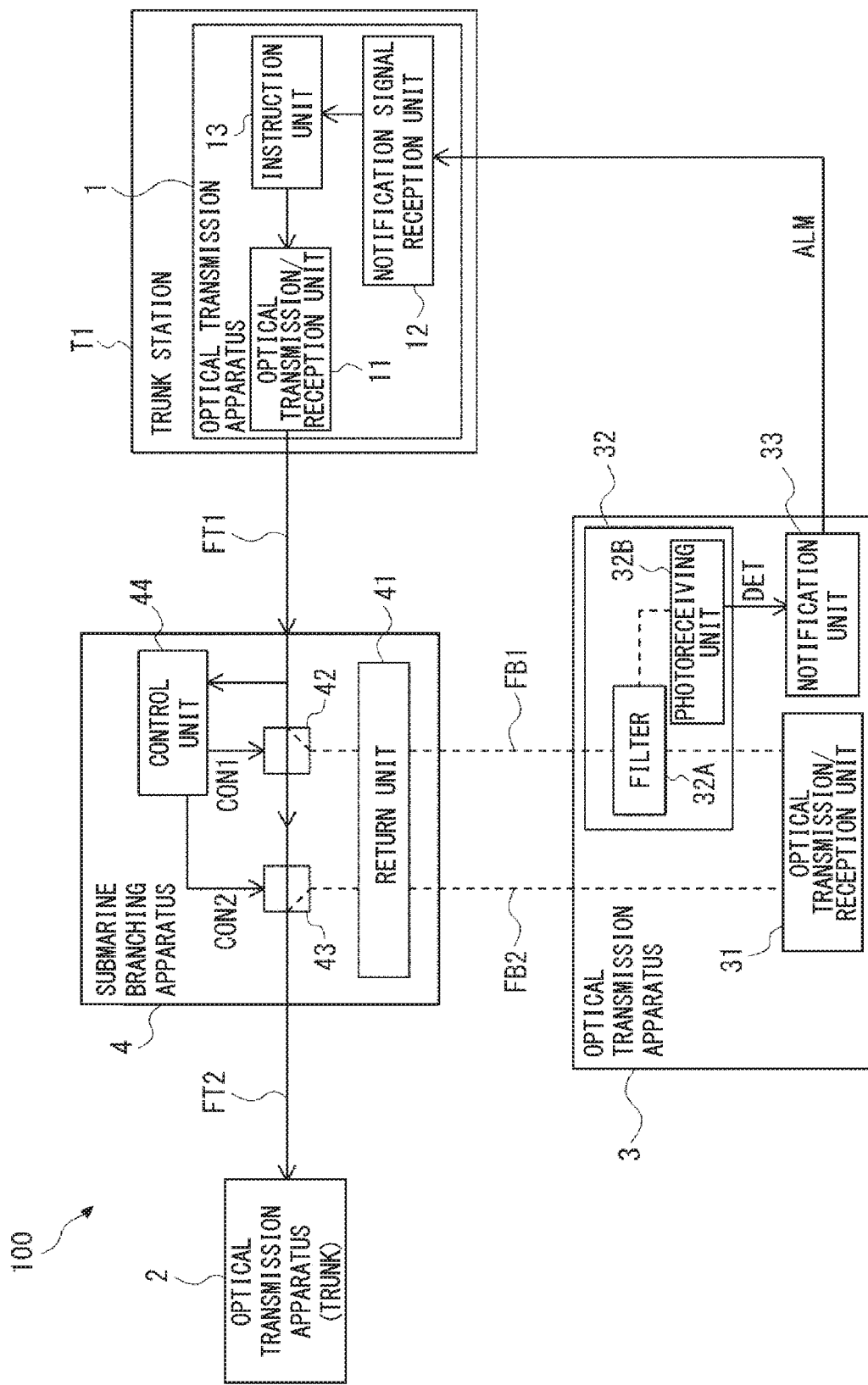
FIG. 4 is a diagram showing a transmission path of a main signal after switching to a trunk path in the submarine optical communication system according to the first example embodiment.

As described above, according to the present configuration, it is possible to monitor the monitoring signal MON that is output from the optical transmission apparatus 3 and returned from the return unit 41 of the submarine branching apparatus 4 and to detect occurrence of a failure in the branch path by detecting a change in the monitoring signal MON. Further, it becomes possible for the optical transmission apparatus 1 to instruct the submarine branching apparatus 4 to switch the transmission path of the optical signal from the branch path to the trunk path by having the optical transmission apparatus 3 inform the notification signal reception unit 12 of the optical transmission apparatus 1 of the occurrence of the failure. FIG. 4 shows the transmission path of the main signal after switching to the trunk path in the submarine optical communication system 100 according to the first example embodiment.

As described above, by detecting occurrence of a failure in the branch path by the optical transmission apparatus connected to the branch path and the branch station and giving an instruction to the submarine branching apparatus 4, it is possible to switch the transmission path in an ideal manner so that the transmission of the main signal is not interrupted.

Further, according to the present configuration, it is possible to detect occurrence of a failure in the branch path as described above even in the configuration in which power is not supplied from the optical transmission apparatus of the branch path to the submarine branching apparatus.

Figure 5:
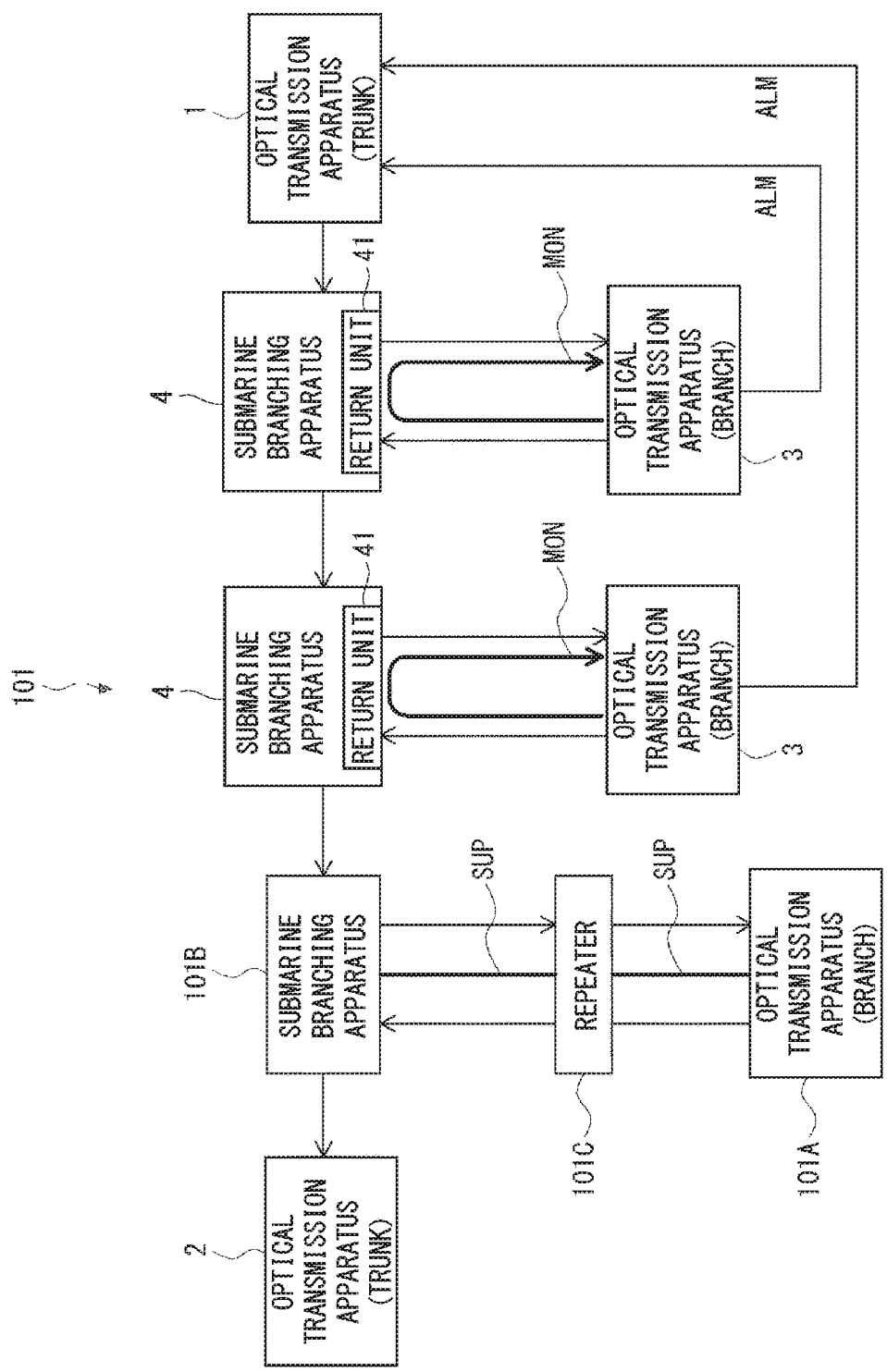
FIG. 5 is a diagram showing a modified example of the submarine optical communication system according to the first example embodiment.

Next, a modified example of the submarine optical communication system 100 is considered. FIG. 5 is a diagram showing a modified example of the submarine optical communication system according to the first example embodiment. A submarine optical communication system 101 shown in FIG. 5 has three submarine branching apparatuses inserted between the optical transmission apparatuses 1 and 2, configuring three branching paths.

As shown in FIG. 5, the two submarine branching apparatuses 4 described above and another submarine branching apparatus 101B are inserted on the trunk path from the optical transmission apparatus 1. Each of the submarine branching apparatuses 4 is connected to the optical transmission apparatus 3 via the branch path. Each of the optical transmission apparatuses 3 can output the notification signal ALM to the optical transmission apparatus 1. The submarine branching apparatus 101B is connected to the optical transmission apparatus 101A via the branch path. A repeater 101C that amplifies the main signal is inserted in the branch path between the optical transmission apparatus 101A and the submarine branching apparatus 101B. Note that power is supplied from the optical transmission apparatus 101A to the submarine branching apparatus 101B and the repeater 101C via a power supply line SUP. Note that there is no need to mention that a failure in the branch path can be detected as described above by having the submarine branching apparatus detect that the power supply has stopped when there is a submarine branching apparatus that has power supplied from the optical transmission apparatus as shown in FIG. 5.

As described above, the optical transmission apparatus 3 and the submarine branching apparatus 4 according to the first example embodiment can configure a submarine optical communication system along with another optical transmission apparatus of a general configuration and a submarine branching apparatus as shown in FIG. 5. That is, even when the repeater to which power is supplied from the optical transmission apparatus is not inserted in the branch path, it is possible to detect a failure in the branch path. Further, when the repeater is not inserted in the branch path, by selecting a wavelength at which the main signal transmitted through the branch path can be amplified by Raman amplification as the wavelength of the monitoring signal, it is possible to extend the length of the optical fiber of the branch path.

Figure 6:
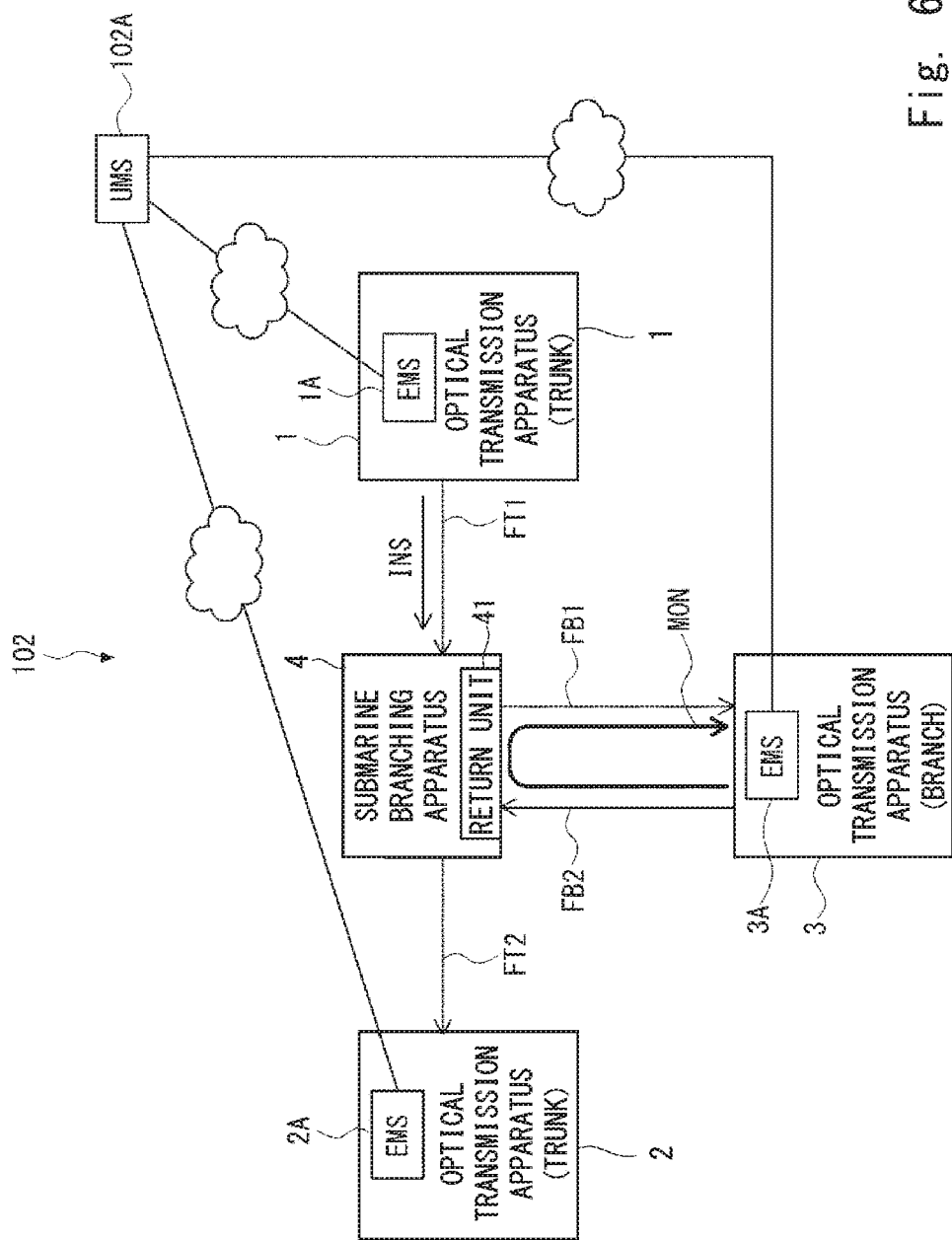
FIG. 6 is a diagram showing a modified example of the submarine optical communication system according to the first example embodiment.

Next, other structural example of the submarine optical communication system 100 is explained. FIG. 6 is a diagram showing a modified example of the submarine optical communication system according to the first example embodiment. In the explanation given above, the notification signal reception unit 12 and the notification unit 33 are described to be configurable as an EMS. Here, an example in which the EMS provided to the optical transmission apparatus performs communication via a cloud network is explained. FIG. 6 is a diagram showing a modified example of the submarine optical communication system according to the first example embodiment. A submarine optical communication system 102 shown in FIG. 6 includes the optical transmission apparatuses 1 to 3 including the EMS 1A, 2A, and 3A, respectively. Each of the EMS 1A, 2A, and 3A can communicate with each other via the cloud network that is controlled by the UMS 102A. For example, the optical transmission apparatus 3 can transmit the notification signal ALM to the optical transmission apparatus 1 via the cloud network.

Further, a SDN (Software Defined Network) controller may be used in place of the UMS and the SDN controller may be set on the cloud. The SDN controller can control the transmission path and the wavelength of the optical signal of the submarine optical communication system in accordance with the state of the network or an instruction from an operator. Further, the SDN controller virtually manages the physical network topology and the resource of the submarine optical communication system and can realize sharing of the system by several users or operators.

As described above, it can be understood that according to the present configuration, the submarine optical communication system can be configured by using not only an exclusive line but also an exclusive or an open cloud network.

Second Example Embodiment

Figure 7:
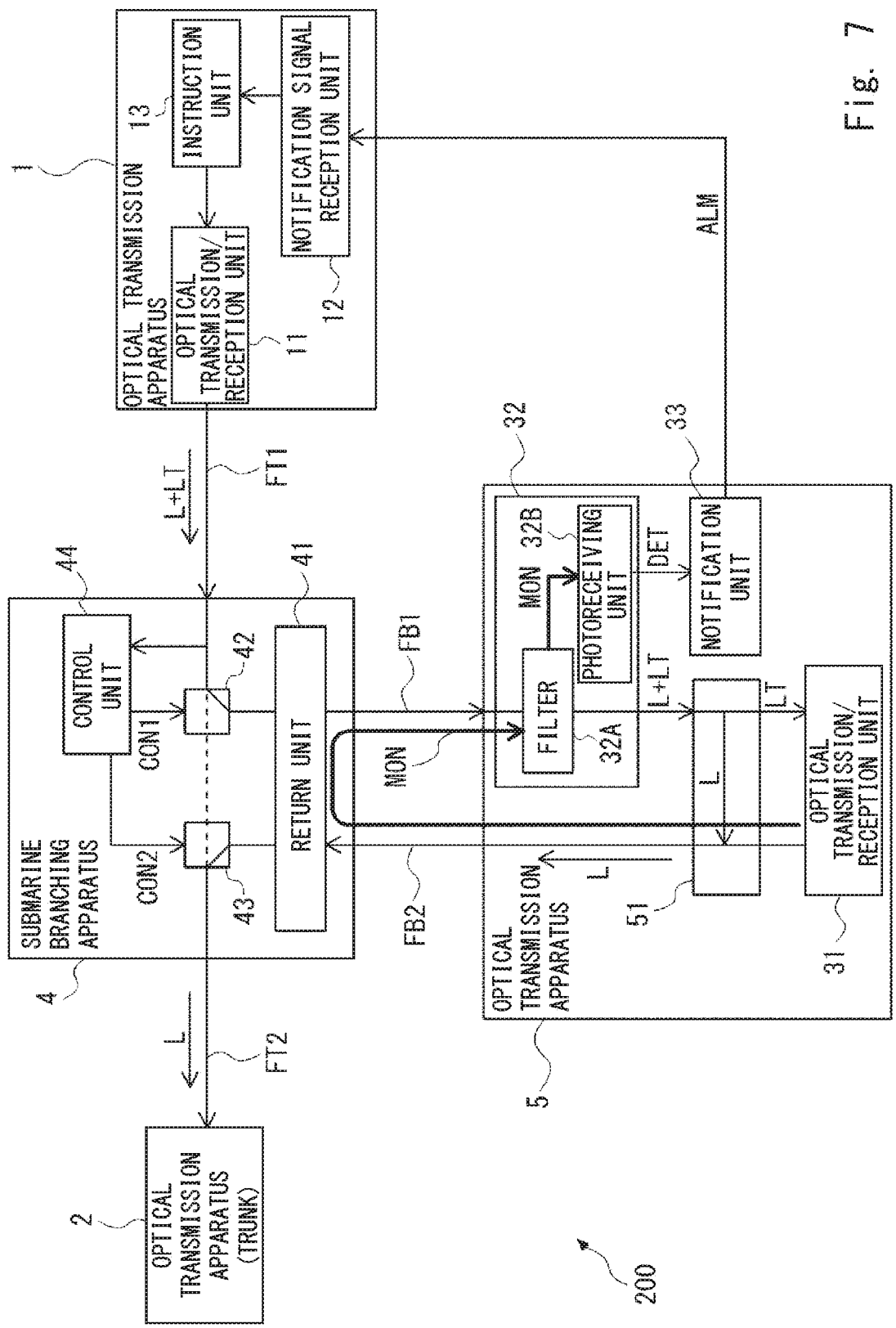
FIG. 7 is a diagram showing a configuration of a submarine optical communication system according to a second example embodiment.

A submarine optical communication system 200 according to a second example embodiment is explained. FIG. 7 is a diagram showing a configuration of the submarine optical communication system 200 according to the second example embodiment. The submarine optical communication system 200 has a configuration in which the optical transmission apparatus 3 of the submarine optical communication system 100 is replaced by an optical transmission apparatus 5.

The optical transmission apparatus 5 has a configuration in which a return unit 51 (hereinafter also referred to as a second return unit) is added to the optical transmission apparatus 3. Among optical signals that are made incident from the submarine branching apparatus 4 via the optical fiber FB1 of the branch path (L+LT in FIG. 7), the optical signal having a wavelength that is the object of reception by the optical transmission apparatus 5 (LT in FIG. 7) passes through the return unit 51 and is made incident on the optical transmission/reception unit 31, and the optical signal having a wavelength that is not the object of reception is returned from the return unit 51 and output to the optical switch 43 of the submarine branching apparatus 4 via the optical fiber FB2 of the branch path.

By this configuration, the optical transmission apparatus 5 can receive only the optical signal having the wavelength which is the object of reception (LT in FIG. 7) and the optical signals having other wavelengths (L in FIG. 7) can be transmitted to the optical transmission apparatus 2 by being returned to the submarine branching apparatus 4 via the trunk path. In other words, the branch station receives only the optical signal having the wavelength which is the object of reception (LT in FIG. 7) and the optical signals having other wavelengths (L in FIG. 7) are substantially not branched and transmitted through the trunk path.

As described above, in the present configuration, the optical signals having the wavelengths other than the wavelength that is the object of reception at the branch station are also transmitted through the branch path temporarily. When a failure occurs in the branch path, the optical signals having the wavelengths other than the wavelength which is the object of reception at the branch station cannot be returned to the submarine branching apparatus 4 and thus, these optical signals cannot be output to the trunk path.

However, in the present configuration, when the failure in the branch path is detected, the transmission path of the optical signal can be switched to the trunk path whereby the optical signals having the wavelengths other than the wavelength which is the object of reception can be continuously transmitted through the trunk path.

Third Example Embodiment

Figure 8:
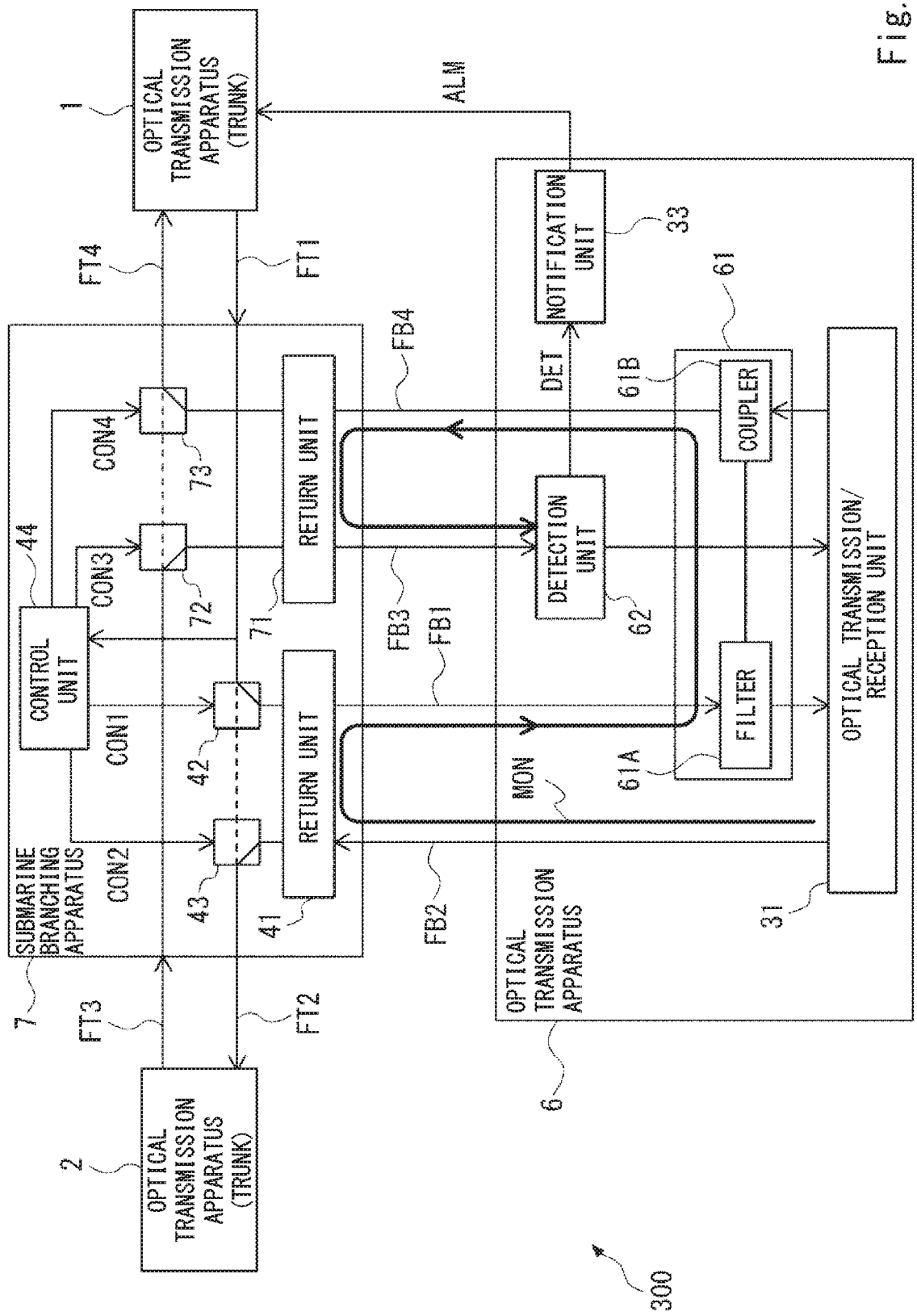
FIG. 8 is a diagram showing a configuration of a submarine optical communication system according to a third example embodiment.

A submarine optical communication system 300 according to a third example embodiment is explained. FIG. 8 shows the submarine optical communication system 300 according to the third example embodiment. The submarine optical communication system 300 has a configuration in which the optical transmission apparatus 3 and the submarine branching apparatus 4 of the submarine optical communication system 100 are replaced by an optical transmission apparatus 6 and a submarine branching apparatus 7, respectively. The submarine optical communication system 300 is configured so as to be capable of further transmitting the main signal (also referred to as a second optical signal) from the optical transmission apparatus 2 towards the optical transmission apparatus 1.

The submarine optical branching apparatus 7 has a configuration in which a return unit 71 and optical switches 72 and 73 are added to the submarine branching apparatus 4.

The control unit 44 controls the optical switches 42, 43, 72, and 73 according to the control signals CON1 to CON4, respectively.

The return unit 71 (also referred to as a third return unit) can selectively return the monitoring signal MON output from the optical transmission apparatus 6 to the optical transmission apparatus 6.

The optical transmission apparatus 2 and the optical switch 72 are connected with each other by an optical fiber FT3 of the trunk path. The optical switch 72 (also referred to as a third optical switch) can switch an output path (output destination) of the main signal received from the optical transmission apparatus 2 via the optical fiber FT3 to the branch path (i.e., a path through which the main signal is output to the optical fiber FB3) or the trunk path (i.e., a path through which the main signal is output to the optical switch 73) in accordance with the control signal CON3.

The optical switch 73 (also referred to as a fourth optical switch) can switch an input path (input destination) of the received optical signal output to the branch path (i.e., a path through which the main signal is received via the optical fiber FB4) or the trunk path (i.e., a path through which the main signal is received from the optical switch 72 and output to the optical transmission apparatus 1 via the optical fiber FT4) in accordance with the control signal CON4.

The optical transmission apparatus 6 has a configuration in which a return unit 61 is added to the optical transmission apparatus 3 and the detection unit 32 is replaced by a detection unit 62 having a similar configuration.

The return unit 61 (also referred to as a fourth return unit) is inserted between the optical fiber FB1 of the branch path (the first branch path) on the return unit 41 side and the optical transmission/reception unit 31 and between the optical fiber FB4 of the branch path (the second branch path) on the return unit 71 side and the optical transmission/reception unit 31, and selectively returns only the monitoring signal MON made incident from the optical fiber FB1 to the optical fiber FB4. For example, the return unit 61 includes a filter 61A and a coupler 61B. The filter 61A is a wavelength filter and selectively separates only a light having a wavelength of the monitoring signal MON. The separated monitoring signal MON is output to the optical fiber FB4 by the coupler 61B.

The detection unit 62 detects the monitoring signal MON made incident from the optical fiber FB3 (also referred to as a third optical fiber) and outputs the detection signal DET that indicates the result of the detection to the notification unit 33.

Next, the transmission path of the monitoring signal MON is explained. The monitoring signal MON output from the optical transmission apparatus 6 is transmitted through the uplink optical fiber FB2 of the branch path and arrives at the return unit 41 and then, it is returned to be transmitted through the downlink optical fiber FB1 of the branch path to thereby arrive at the return unit 61. Then, the monitoring signal MON is returned from the return unit 61 and output to the uplink optical fiber FB4 (the fourth optical fiber) of the adjacent branch path. Thereafter, the monitoring signal MON is transmitted through the uplink optical fiber FB4 of the branch path and arrives at the return unit 71, and then it is returned to be transmitted through the downlink optical fiber FB3 of the branch path and arrives at the detection unit 62.

As described above, according to the present configuration, by providing the return unit for the monitoring signal to the optical transmission apparatus of the branch station, it is possible to collectively detect failures that may occur in the two branch paths. Further, since the failures that may occur in the two branch paths can be detected without having to provide a detection unit for each branch path, it is possible to realize downsizing of the optical transmission apparatus.

Figure 9:
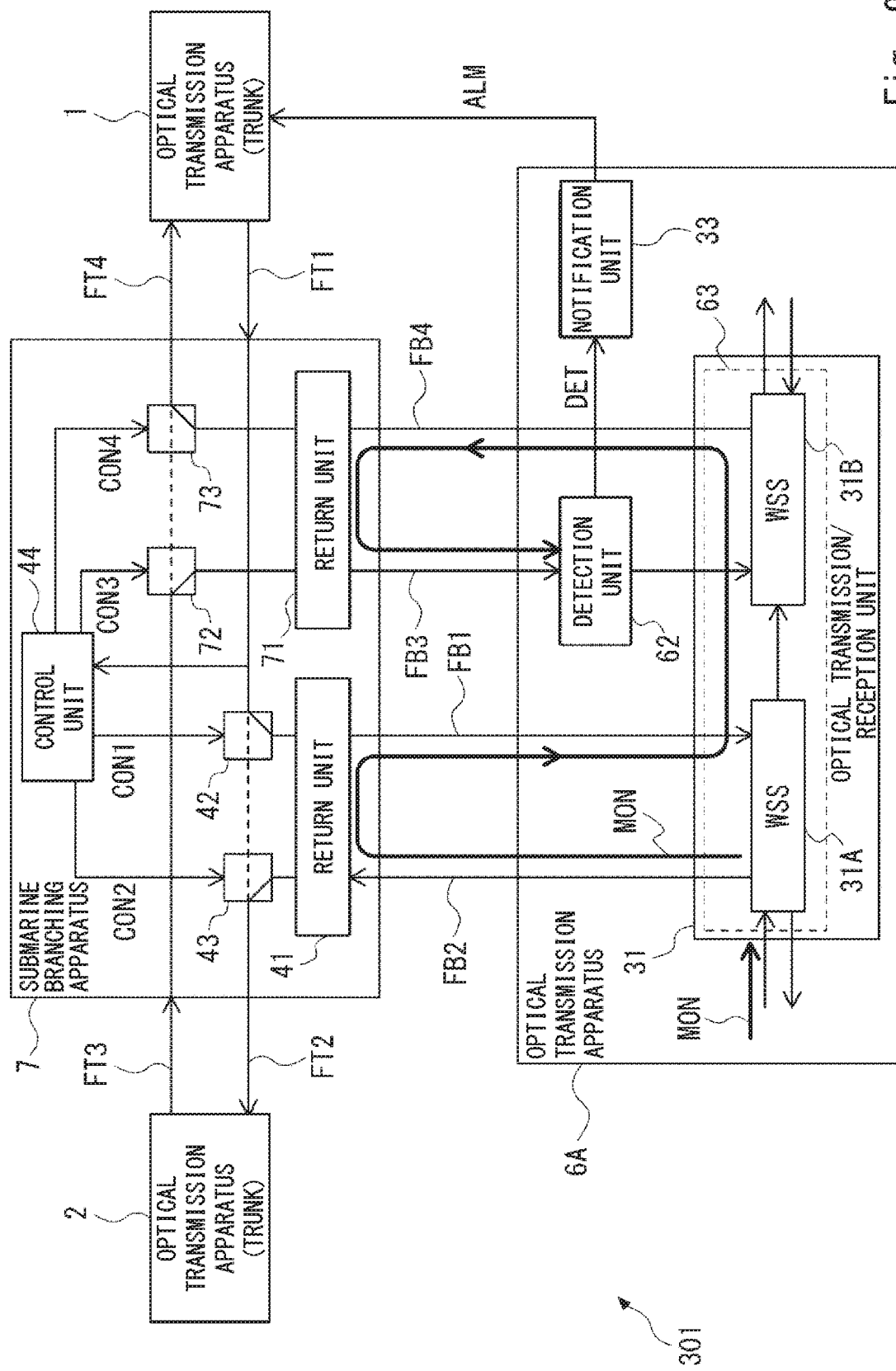
FIG. 9 is a diagram showing a modified example of the submarine optical communication system according to the third example embodiment.

Next, a modified example of the submarine optical communication system 300 is explained. FIG. 9 shows a modified example of the submarine optical communication system according to the third example embodiment. A submarine optical communication system 301 shown in FIG. 9 has a configuration in which the optical transmission apparatus 6 is replaced by an optical transmission apparatus 6A. The optical transmission apparatus 6A has a configuration in which the return unit 61 of the optical transmission apparatus 6 is removed and the monitoring signal MON is returned inside the optical transmission/reception unit 31.

The optical transmission/reception unit 31 includes, for example, a Wavelength Selectable Switch (hereinbelow referred to as the WSS) for separating and synthesizing each wavelength of the wavelength-division multiplexed signal. In this example, WSS 31A is provided on the first branch path side and WSS 31B is provided on the second branch path side. As described below, the WSS 31A and the WSS31B function as a return unit 63. The monitoring signal MON is input from an external signal generation unit (not shown) to the WSS 31A. The WSS 31A selectively outputs the monitoring signal MON to the optical fiber FB2 and selectively outputs the monitoring signal MON that is returned from the return unit 41 and made incident via the optical fiber FB1 to the WSS 31B. The WSS 31B selectively outputs the monitoring signal MON that is made incident from the WSS 31A to the optical fiber FB4. The monitoring signal MON output from the WSS 31B is returned from the return unit 71 and detected by the detection unit 62.

As described above, the submarine optical communication system 301 of the present configuration can collectively detect failures that may occur in the two branch paths by providing a return unit for the monitoring signal to the optical transmission apparatus of the branch station in the same manner as in the submarine optical communication system 300. Further, since the failures that may occur in the two branch paths can be detected without having to provide a detection unit for each branch path, it is possible to realize downsizing of the optical transmission apparatus.

Further, according the present configuration, it is possible to configure the return unit for the monitoring signal by utilizing the WSS provided to the optical transmission/reception unit 31, which can be said as being advantageous in terms of downsizing the optical transmission apparatus compared to the submarine optical communication system 300 in which a return unit is provided externally to the optical transmission/reception unit 31 using an additional optical component.

Fourth Example Embodiment

Figure 10:
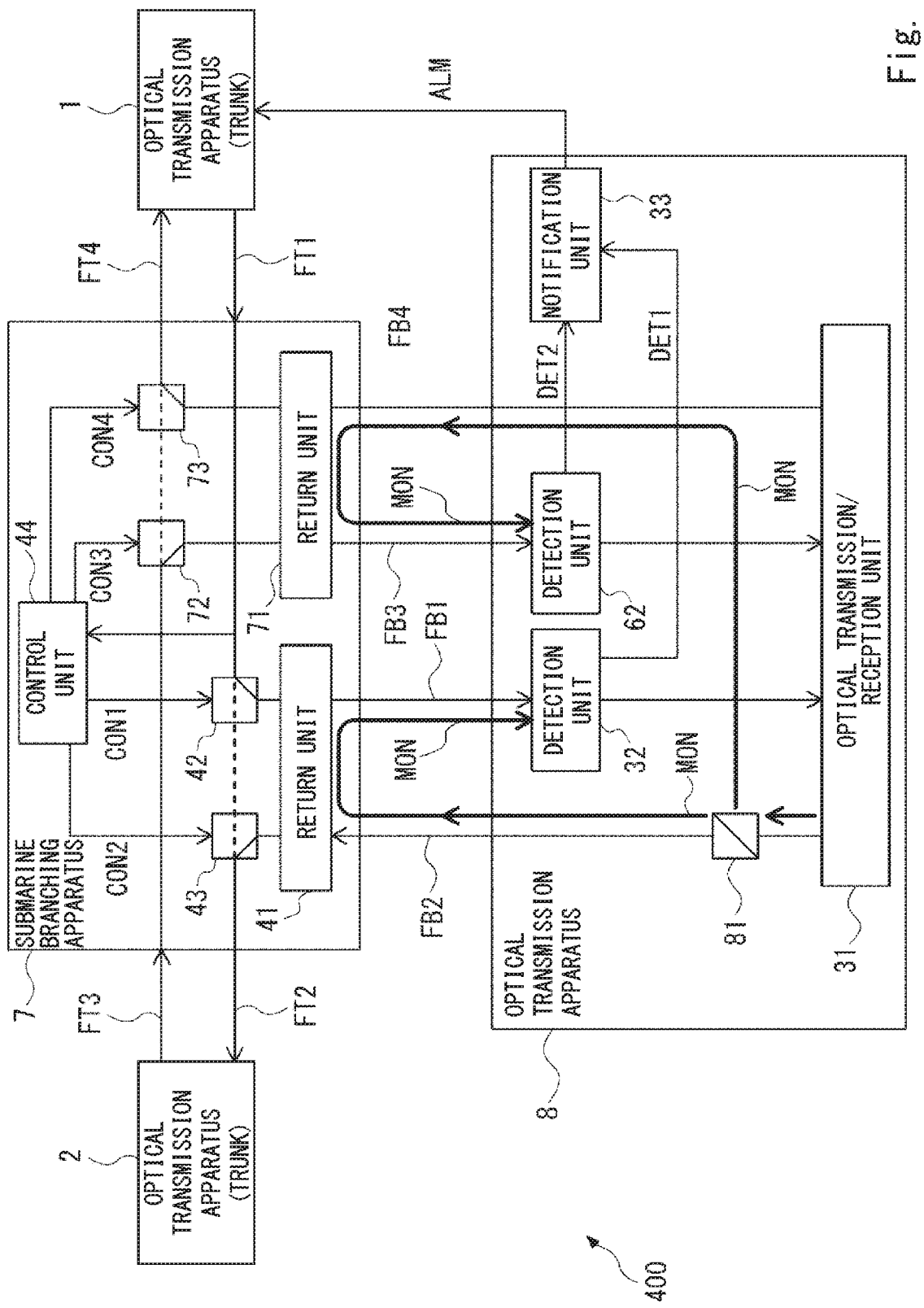
FIG. 10 is a diagram showing a configuration of a submarine optical communication system according to a fourth example embodiment.

A submarine optical communication system 400 according to a fourth example embodiment is explained. FIG. 10 is a diagram showing a configuration of the submarine optical communication system 400 according to the fourth example embodiment. The submarine optical communication system 400 has a configuration in which the optical transmission apparatus 6 of the submarine optical communication system 300 is replaced by an optical transmission apparatus 8.

The optical transmission apparatus 8 has a configuration in which the return unit 61 of the optical transmission apparatus 6 is removed and a branching unit 81 and the detection unit 32 are added. The branching unit 81 branches the monitoring signal MON output from the optical transmission/reception unit 31 into two. One of the branched monitoring signal MON is input to the uplink optical fiber FB2 of the first branch path and the other one of the branched monitoring signal MON is input to the uplink optical fiber FB4 of the second branch path.

The monitoring signal MON input to the optical fiber FB2 is returned from the return unit 41 and is made incident on the detection unit 32 via the downlink optical fiber FB1 of the first branch path. The detection unit 32 outputs a detection signal DET1 that indicates the result of the detection by the monitoring signal MON to the notification unit 33.

The monitoring signal MON input to the optical fiber FB4 is returned from the return unit 71 and is made incident on the detection unit 62 via the downlink optical fiber FB3 of the second branch. The detection unit 62 outputs a detection signal DET2 that indicates the result of the detection by the monitoring signal MON to the notification unit 33.

As described above, according to the present configuration, it is possible to collectively detect failures that may occur in the two branch paths in the same manner as in the submarine optical communication system 300 according to the third example embodiment. Further, since the failures that may occur in the two branch paths can be detected without having to generate a monitoring signal for each branch path, it is possible to realize downsizing of the optical transmission apparatus.

Further, according to the present configuration, a detection unit dedicated to each branch path is provided whereby it is possible to detect whether or not a failure has occurred in either one of the two branch paths.

Figure 11:
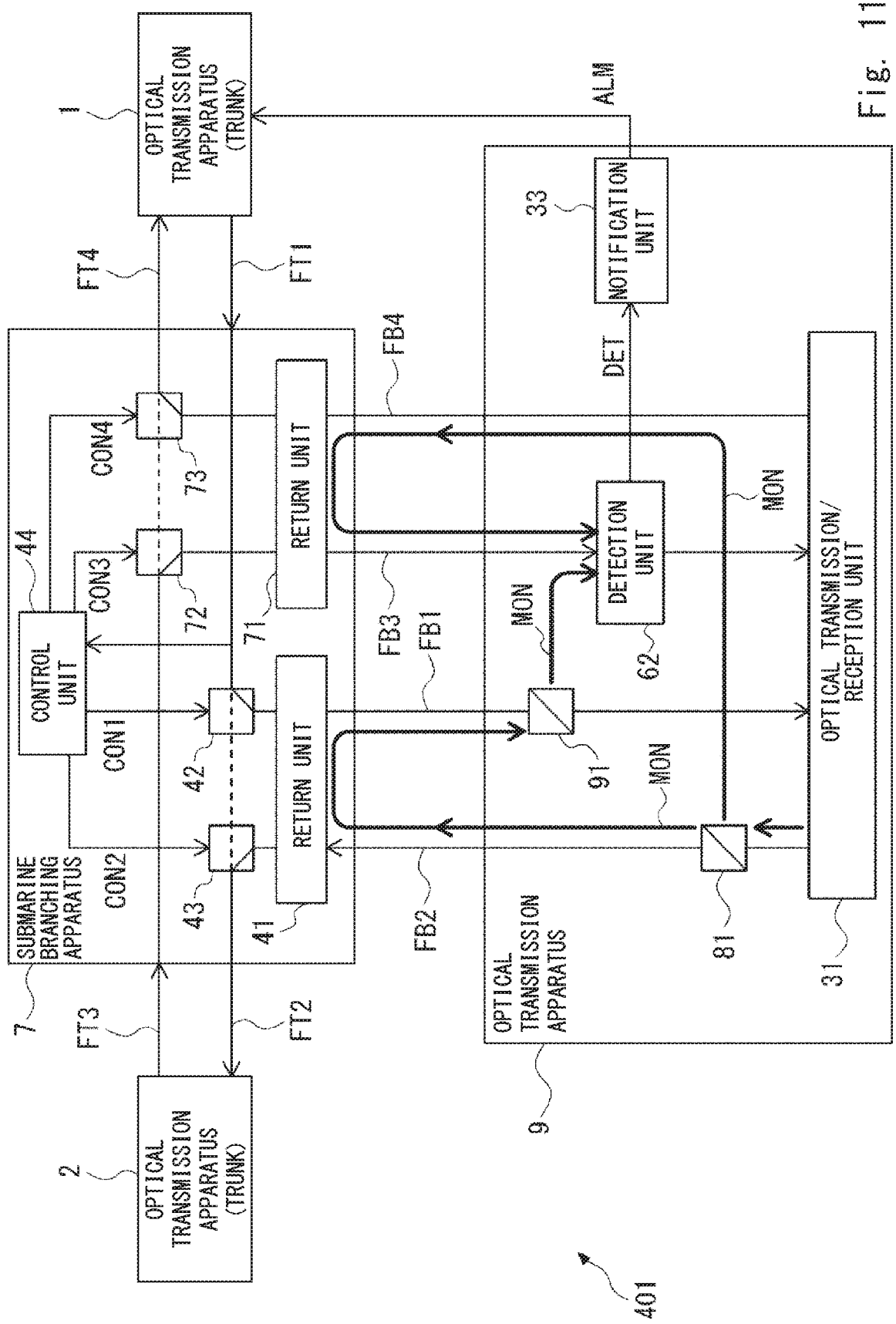
FIG. 11 is a diagram showing a modified example of the submarine optical communication system according to the fourth example embodiment.

Next, a modified example of the submarine optical communication system 400 described above is explained. FIG. 11 shows a modified example of the submarine optical communication system according to the fourth example embodiment. A submarine optical communication system 401 shown in FIG. 11 has a configuration in which the optical transmission apparatus 8 of the submarine optical communication system 400 is replaced by an optical transmission apparatus 9.

The optical transmission apparatus 9 has a configuration in which the detection unit 32 of the optical transmission apparatus 8 is removed and a branching unit 91 is added.

Like in the case of the optical transmission apparatus 8, the branching unit 81 branches the monitoring signal MON output from the optical transmission/reception unit 31 into two. One of the branched monitoring signal MON is input to the uplink optical fiber FB2 of the first branch path and the other one of the branched monitoring signal MON is input to the uplink optical fiber FB4 of the second branch path.

The monitoring signal MON input to the optical fiber FB2 is returned from the return unit 41 and is made incident on the branching unit 91 via the downlink optical fiber FB1 of the first branch path. The branching unit 91 selectively branches the light having a wavelength of the monitoring signal MON and transmits lights having other wavelengths toward the optical transmission/reception unit 31. Accordingly, the monitoring signal MON is branched by the branching unit 91 and output to the detection unit 62.

The monitoring signal MON input to the optical fiber FB4 is returned from the return unit 71 and is made incident on the detection unit 62 via the downlink optical fiber FB3 of the second branch.

The detection unit 62 outputs the detection signal DET that indicates the result of the detection by the monitoring signal MON to the notification unit 33.

In the present configuration, since the first and the second branch paths are monitored using one detection unit, when a failure occurs in either one of the two branch paths, the optical intensity of the monitoring signal MON detected by the detection unit 62 lowers. Therefore, in the present configuration, by having the detection unit 62 compare the optical intensity of the monitoring signal MON with the prescribed threshold value, it is possible to detect that a failure has occurred in at least one of the first or the second branch path.

As described above, the submarine optical communication system 401 can eliminate the detection unit provided to the optical transmission apparatus at the branch station when compared with the submarine optical communication system 400. Therefore, it is advantageous in terms of realizing the downsizing of the optical transmission apparatus.

OTHER EXAMPLE EMBODIMENTS

Note that the present disclosure is not limited to the example embodiments mentioned above and can be modified as appropriate without departing from the gist of the present disclosure. For example, in the example embodiments mentioned above, the monitoring signal was output to the uplink optical fiber of the branch path and the monitoring signal which was received via the downlink optical fiber has been detected, however, this is merely an example. In other words, a configuration in which the monitoring signal is output to the downlink optical fiber of the branch path and the monitoring signal which was received via the uplink optical fiber is detected as the monitoring signal may be adopted.

In the example embodiments described above, the receiver has been described as one that receives the DP-QPSK optical signal, however, this is merely an example.

For example, it may be configured such that optical signals of other modulation techniques can be transmitted.

The present disclosure has been described above with reference to the example embodiments, however, the present disclosure is not to be limited to the aforementioned disclosure. The configuration and the details of the present disclosure can be modified in various ways within the scope that is understandable by a person skilled in the art.

This application is based upon and claims the benefit of priority from Japanese patent application No. 2017-208874, filed on Oct. 30, 2017, the disclosure of which is incorporated herein in its entirety by reference.

REFERENCE SIGNS LIST

ALM NOTIFICATION SIGNAL
B1 BRANCH STATION
CON1-CON4 CONTROL SIGNAL
DET, DET1, DET 2 DETECTION SIGNAL
FB1 to FB4, FT1 to FT4 OPTICAL FIBER
INS INSTRUCTION SIGNAL
MON MONITORING SIGNAL
SUP POWER SUPPLY LINE
T1, T2 TRUNK STATION
TL TRUNK PATH
1-3, 5, 6, 6A, 8, 9 OPTICAL TRANSMISSION APPARATUS
4, 7 SUBMARINE BRANCHING APPARATUS
11 OPTICAL TRANSMISSION/RECEPTION UNIT
11A, 11C MULTIPLEXER
11B SIGNAL GENERATION UNIT
12 NOTIFICATION SIGNAL RECEPTION UNIT
13 INSTRUCTION UNIT
14 OPTICAL TRANSMITTER/RECEIVER
31 OPTICAL TRANSMISSION/RECEPTION UNIT
32, 62 DETECTION UNIT
32A, 41A, 61A FILTER
32B OPTICAL RECEPTION UNIT
33 NOTIFICATION UNIT
41, 51, 61, 63, 71 RETURN UNIT
41B, 61B COUPLER
42, 43, 72, 73 OPTICAL SWITCH
44 CONTROL UNIT
81, 91 BRANCHING UNIT
100, 101, 102, 200, 300, 301, 400, 401 SUBMARINE OPTICAL COMMUNICATION SYSTEM
101A OPTICAL TRANSMISSION APPARATUS
101B SUBMARINE BRANCHING APPARATUS
101C REPEATER

The invention claimed is:

1. A submarine optical communication system comprising:
a first optical transmission apparatus outputting a first optical signal;
a second optical transmission apparatus;
a third optical transmission apparatus outputting a monitoring signal;
a submarine branching apparatus including a first filter unit returning the monitoring signal received from the third optical transmission apparatus and switching an output destination of the first optical signal received from the first optical transmission apparatus to the second optical transmission apparatus or the third optical transmission apparatus;
a first optical fiber transmitting the first optical signal output from the submarine branching apparatus to the third optical transmission apparatus; and
a second optical fiber connecting the third optical transmission apparatus and the submarine branching apparatus, wherein
the submarine branching apparatus comprises:
a first optical switch receiving the first optical signal from the first optical transmission apparatus;
a second optical switch outputting an optical signal input thereto to the second optical transmission apparatus; and
a control unit controlling the first and second optical switches in accordance with an instruction from the first optical transmission apparatus, wherein
the third optical transmission apparatus comprises:
an optical transmission/reception unit outputting the monitoring signal to one end of the second optical fiber;
a detection unit detecting the monitoring signal which is returned from the first filter unit, transmitted through the first optical fiber, and input to the third optical transmission apparatus;
a notification unit notifying the first optical transmission apparatus of a result of the detection by the detection unit; and
a second filter unit outputting an optical signal having a prescribed wavelength contained in the first optical signal received from the submarine branching apparatus to the optical transmission/reception unit via the first optical fiber and returning an optical signal having another wavelength contained in the first optical signal received from the submarine branching apparatus to the submarine branching apparatus via the second optical fiber, wherein
under a state in which the output destination of the first optical signal is the third optical transmission apparatus, the third optical transmission apparatus detects the monitoring signal returned from the first filter unit, and notifies the first optical transmission apparatus of the result of the detection when the optical intensity of the monitoring signal received by the third optical transmission apparatus is smaller than the prescribed value, and
the first optical transmission apparatus instructs the submarine branching apparatus to switch the output destination of the first optical signal to the second optical transmission apparatus in accordance with the notification, and
when receiving the instruction, the control unit:
switches an output destination of the first optical signal of the first optical switch from the third optical transmission apparatus to the second optical switch, and
switches an input source of the optical signal input to the second optical switch from the third optical transmission apparatus to the first optical switch.

2. A submarine optical communication system comprising:
a first optical transmission apparatus outputting a first optical signal;
a second optical transmission apparatus;
a third optical transmission apparatus outputting a monitoring signal;
a submarine branching apparatus including a first filter unit returning the monitoring signal received from the third optical transmission apparatus and switching an output destination of the first optical signal received from the first optical transmission apparatus to the second optical transmission apparatus or the third optical transmission apparatus;
a first optical fiber transmitting the first optical signal output from the submarine branching apparatus to the third optical transmission apparatus; and
a second optical fiber connecting the third optical transmission apparatus and the submarine branching apparatus;
a third optical fiber transmitting the second optical signal output from the submarine branching apparatus to the third optical transmission apparatus; and
a fourth optical fiber connecting the third optical transmission apparatus to the submarine branching apparatus, wherein
the third optical transmission apparatus further detects the monitoring signal returned from the first filter unit and notifies the first optical transmission apparatus of a result of the detection,
the first optical transmission apparatus further instructs the submarine branching apparatus to switch the output destination of the first optical signal in accordance with the notification, and
the submarine branching apparatus switches the output destination of the first optical signal to the second optical transmission apparatus when an optical intensity of the monitoring signal received by the third optical transmission apparatus is smaller than a prescribed value under a state in which the output destination of the first optical signal is the third optical transmission apparatus, wherein
the submarine branching apparatus further comprises:
a first optical switch receiving the first optical signal from the first optical transmission apparatus; and
a second optical switch outputting an optical signal input thereto to the second optical transmission apparatus; and
a control unit controlling the first and the second optical switches in accordance with an instruction from the first optical transmission apparatus, wherein
when the optical intensity of the monitoring signal received by the third optical transmission apparatus is smaller than the prescribed value, the control unit switches:
an output destination of the first optical signal of the first optical switch from the third optical transmission apparatus to the second optical switch; and
an input source of the optical signal received by the second optical switch from the third optical transmission apparatus to the first optical switch, wherein
the third optical transmission apparatus comprises:
an optical transmission/reception unit outputting the monitoring signal to the second optical fiber;
a detection unit detecting the monitoring signal which is returned from the first filter unit, transmitted through the first optical fiber, and input to the third optical transmission apparatus; and
a notification unit notifying the first optical transmission apparatus of a result of the detection by the detection unit, wherein
the second optical transmission apparatus outputs a second optical signal, and
the submarine branching apparatus further comprises a second filter unit returning the monitoring signal received from the third optical transmission apparatus and switching an output destination of the second optical signal received from the second optical transmission apparatus to the first optical transmission apparatus or the third optical transmission apparatus, wherein
the submarine branching apparatus further comprises:
a third optical switch receiving the second optical signal received from the second optical transmission apparatus; and
a fourth optical switch outputting an optical signal input thereto to the first optical transmission apparatus, wherein
when the optical intensity of the monitoring signal received by the third optical transmission apparatus is smaller than the prescribed value, the control unit switches:
an output destination of the second optical signal of the third optical switch from the third optical transmission apparatus to the fourth optical switch; and
an input source of the optical signal input to the fourth optical switch from the third optical transmission apparatus to the third optical switch, wherein
the third optical transmission apparatus further comprises a third filter unit returning the monitoring signal received from the submarine branching apparatus via the first optical fiber and outputting the returned monitoring signal to the fourth optical fiber, and
the detection unit further detects the monitoring signal which is returned from the third filter unit, transmitted through the third optical fiber, and received by the third optical transmission apparatus.

3. A submarine optical communication system comprising:
a first optical transmission apparatus outputting a first optical signal;
a second optical transmission apparatus;
a third optical transmission apparatus outputting a monitoring signal;
a submarine branching apparatus including a first filter unit returning the monitoring signal received from the third optical transmission apparatus and switching an output destination of the first optical signal received from the first optical transmission apparatus to the second optical transmission apparatus or the third optical transmission apparatus;
a first optical fiber transmitting the first optical signal output from the submarine branching apparatus to the third optical transmission apparatus; and
a second optical fiber connecting the third optical transmission apparatus and the submarine branching apparatus, wherein
the third optical transmission apparatus further detects the monitoring signal returned from the first filter unit and notifies the first optical transmission apparatus of a result of the detection,
the first optical transmission apparatus further instructs the submarine branching apparatus to switch the output destination of the first optical signal in accordance with the notification, and
the submarine branching apparatus switches the output destination of the first optical signal to the second optical transmission apparatus when an optical intensity of the monitoring signal received by the third optical transmission apparatus is smaller than a prescribed value under a state in which the output destination of the first optical signal is the third optical transmission apparatus, wherein the submarine branching apparatus further comprises:
- a first optical switch receiving the first optical signal from the first optical transmission apparatus; and
- a second optical switch outputting an optical signal input thereto to the second optical transmission apparatus; and
- a control unit controlling the first and the second optical switches in accordance with the instruction from the first optical transmission apparatus, wherein
- when the optical intensity of the monitoring signal received by the third optical transmission apparatus is smaller than the prescribed value, the control unit switches:
  - an output destination of the first optical signal of the first optical switch from the third optical transmission apparatus to the second optical switch; and
  - an input source of the optical signal input to the second optical switch from the third optical transmission apparatus to the first optical switch, wherein
  - the third optical transmission apparatus comprises:
    - an optical transmission/reception unit outputting the monitoring signal to the second optical fiber;
    - a detection unit detecting the monitoring signal which is returned from the first filter unit, transmitted through the first optical fiber, and input to the third optical transmission apparatus; and
    - a notification unit notifying the first optical transmission apparatus of a result of the detection by the detection unit, wherein
  - the second optical transmission apparatus outputs a second optical signal,
  - the submarine branching apparatus further comprises a second filter unit returning the monitoring signal received from the third optical transmission apparatus and switching an output destination of the second optical signal received from the second optical transmission apparatus to the first optical transmission apparatus or the third optical transmission apparatus, and
  - the third optical transmission apparatus further comprises a branching unit branching the monitoring signal output from the optical transmission/reception unit, outputting one of the branched monitoring signal to the first filter unit, and outputting the other one of the branched monitoring signal to the second filter unit.

4. The submarine optical communication system according to claim 3, wherein
the detection unit detects the monitoring signal returned from the first filter unit and the monitoring signal returned from the second filter unit, and
the detection unit comprises:
- a first detection unit detecting the monitoring signal returned from the first filter unit and outputting a result of the detection to the notification unit; and
- a second detection unit detecting the monitoring signal returned from the second filter unit and outputting a result of the detection to the notification unit.

5. A submarine optical communication system comprising:
- a first optical transmission apparatus outputting a first optical signal;
- a second optical transmission apparatus;
- a third optical transmission apparatus outputting a monitoring signal;
- a submarine branching apparatus including a first filter unit returning the monitoring signal received from the third optical transmission apparatus and switching an output destination of the first optical signal received from the first optical transmission apparatus to the second optical transmission apparatus or the third optical transmission apparatus;
- a first optical fiber transmitting the first optical signal output from the submarine branching apparatus to the third optical transmission apparatus; and
- a second optical fiber connecting the third optical transmission apparatus and the submarine branching apparatus, wherein the submarine branching apparatus further comprises:
- a first optical switch receiving the first optical signal from the first optical transmission apparatus;
- a second optical switch outputting an optical signal input thereto to the second optical transmission apparatus; and
- a control unit controlling the first and second optical switches in accordance with an instruction from the first optical transmission apparatus, and the third optical transmission apparatus comprises:
- an optical transmission/reception unit outputting the monitoring signal to the second optical fiber;
- a detection unit detecting the monitoring signal which is returned from the first return unit, transmitted through the first optical fiber, and input to the third optical transmission apparatus; and
- a notification unit notifying the first optical transmission apparatus of a result of the detection by the detection unit, wherein
- the third optical transmission apparatus further detects the monitoring signal returned from the first filter unit and notifies the first optical transmission apparatus of a result of the detection,
- the first optical transmission apparatus further instructs the submarine branching apparatus to switch the output destination of the first optical signal in accordance with the notification, and
- the submarine branching apparatus switches the output destination of the first optical signal to the second optical transmission apparatus when an optical intensity of the monitoring signal received by the third optical transmission apparatus is smaller than a prescribed value under a state in which the output destination of the first optical signal is the third optical transmission apparatus, wherein
- the third optical transmission apparatus further comprises a second filter unit receiving the first optical signal, an optical signal having a prescribed wavelength contained in the first optical signal from the submarine branching apparatus passing through the second filter unit to the optical transmission/reception unit and an optical signal having another wavelength contained in the first optical signal received from the submarine branching apparatus being returned by the second filter unit to the submarine branching apparatus, wherein when the optical intensity of the monitoring signal received by the third optical transmission apparatus is smaller than the prescribed value, the control unit:
switches an output destination of the first optical signal of the first optical switch from the third optical transmission apparatus to the second optical switch; and
switches an input source of the optical signal input to the second optical switch from the third optical transmission apparatus to the first optical switch.

6. A submarine optical communication system comprising:
a first optical transmission apparatus outputting a first optical signal;
a second optical transmission apparatus;
a third optical transmission apparatus outputting a monitoring signal; and
a submarine branching apparatus including a first filter unit returning the monitoring signal received from the third optical transmission apparatus and switching an output destination of the first optical signal received from the first optical transmission apparatus to the second optical transmission apparatus or the third optical transmission apparatus, wherein
the third optical transmission apparatus further detects the monitoring signal returned from the first filter unit and notifies the first optical transmission apparatus of a result of the detection,
the first optical transmission apparatus further instructs the submarine branching apparatus to switch the output destination of the first optical signal in accordance with the notification, and
the submarine branching apparatus switches the output destination of the first optical signal to the second optical transmission apparatus when an optical intensity of the monitoring signal received by the third optical transmission apparatus is smaller than a prescribed value under a state in which the output destination of the first optical signal is the third optical transmission apparatus, wherein
the second optical transmission apparatus outputting a second optical signal, and
the submarine branching apparatus further comprises a second filter unit returning the monitoring signal received from the third optical transmission apparatus and switching an output destination of the second optical signal received from the second optical transmission apparatus to the first optical transmission apparatus or the third optical transmission apparatus, wherein
the third optical transmission apparatus further comprises a third filter unit returning the monitoring signal returned from the first filter unit.

7. The submarine optical communication system according to claim 6, wherein the third optical transmission apparatus detects the monitoring signal which is returned from the third filter unit, and further returned from the second filter unit.

8. A submarine optical communication system comprising:
a first optical transmission apparatus outputting a first optical signal;
a second optical transmission apparatus;
a third optical transmission apparatus outputting a monitoring signal; and
a submarine branching apparatus including a first filter unit returning the monitoring signal received from the third optical transmission apparatus and switching an output destination of the first optical signal received from the first optical transmission apparatus to the second optical transmission apparatus or the third optical transmission apparatus, wherein
the third optical transmission apparatus further detects the monitoring signal returned from the first filter unit and notifies the first optical transmission apparatus of a result of the detection,
the first optical transmission apparatus further instructs the submarine branching apparatus to switch the output destination of the first optical signal in accordance with the notification, and
the submarine branching apparatus switches the output destination of the first optical signal to the second optical transmission apparatus when an optical intensity of the monitoring signal received by the third optical transmission apparatus is smaller than a prescribed value under a state in which the output destination of the first optical signal is the third optical transmission apparatus, wherein
the second optical transmission apparatus outputting a second optical signal, and
the submarine branching apparatus further comprises a second filter unit returning the monitoring signal received from the third optical transmission apparatus and switching an output destination of the second optical signal received from the second optical transmission apparatus to the first optical transmission apparatus or the third optical transmission apparatus, wherein
the third optical transmission apparatus further detects the monitoring signal returned from the first filter unit to notify a result of the detection of the monitoring signal returned from the first filter unit, and detects the monitoring signal returned from the second filter unit to notify a result of the detection of the monitoring signal returned from the second filter unit.

* * * * *